United States Patent [19]

Rickey et al.

[11] Patent Number: 4,528,041

[45] Date of Patent: Jul. 9, 1985

[54] METHOD FOR PIGGING HYDROCARBON PRODUCT FLOWLINES

[75] Inventors: Wynn P. Rickey, Houston; Deborah H. Dobson, Cypress; Roger W. Huffaker, Houston, all of Tex.

[73] Assignee: Exxon Production Research Co., Houston, Tex.

[21] Appl. No.: 586,927

[22] Filed: Mar. 7, 1984

[51] Int. Cl.³ .............................................. B08B 9/04
[52] U.S. Cl. ......................................... 134/8; 166/311
[58] Field of Search .................... 134/8, 22.1, 22.11, 134/22.12; 15/104.06 R, 104.06 A; 137/244, 245; 166/311, 362

[56] References Cited

U.S. PATENT DOCUMENTS

| 3,519,078 | 7/1970 | Harrison | 166/313 |
| 3,608,631 | 9/1971 | Sizer et al. | 166/70 |
| 3,637,012 | 1/1972 | Sizer et al. | 166/250 |
| 3,682,186 | 8/1972 | Howe | 15/104.06 A |

Primary Examiner—Richard V. Fisher
Assistant Examiner—Sharon T. Cohen
Attorney, Agent, or Firm—Keith A. Bell

[57] ABSTRACT

A method and apparatus for cleaning debris from the interior surfaces of two flowlines, particularly dissimilar sized flowlines, utilizes a crossover flowline, crossover valve, and two bypass flowlines and bypass valves, wherein the bypass flowlines communicate between a respective flowline and the crossover flowline.

12 Claims, 6 Drawing Figures

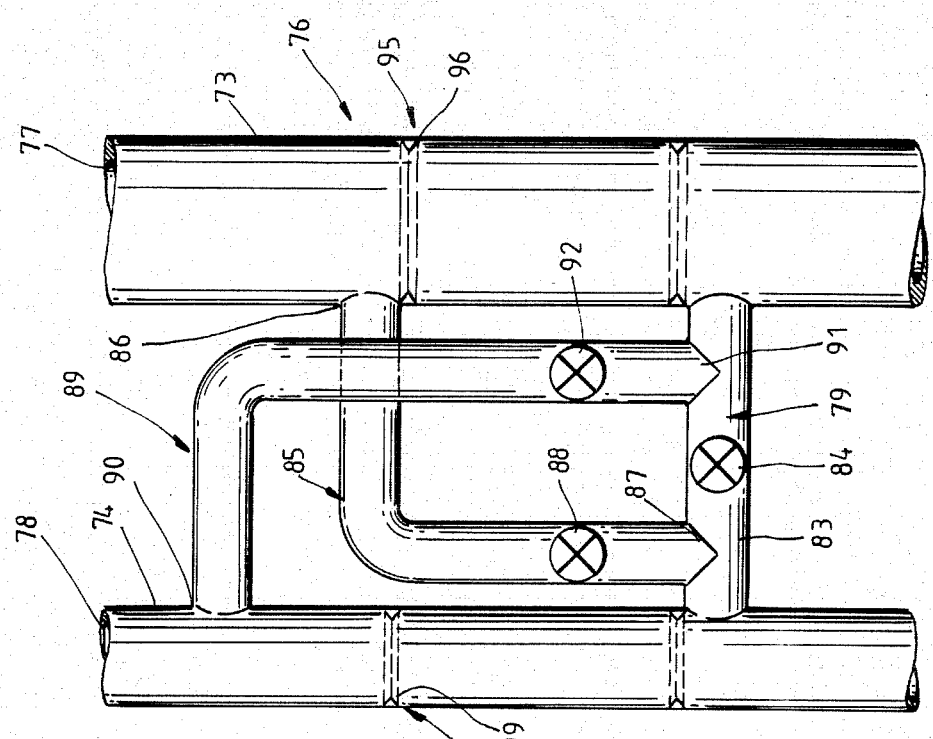
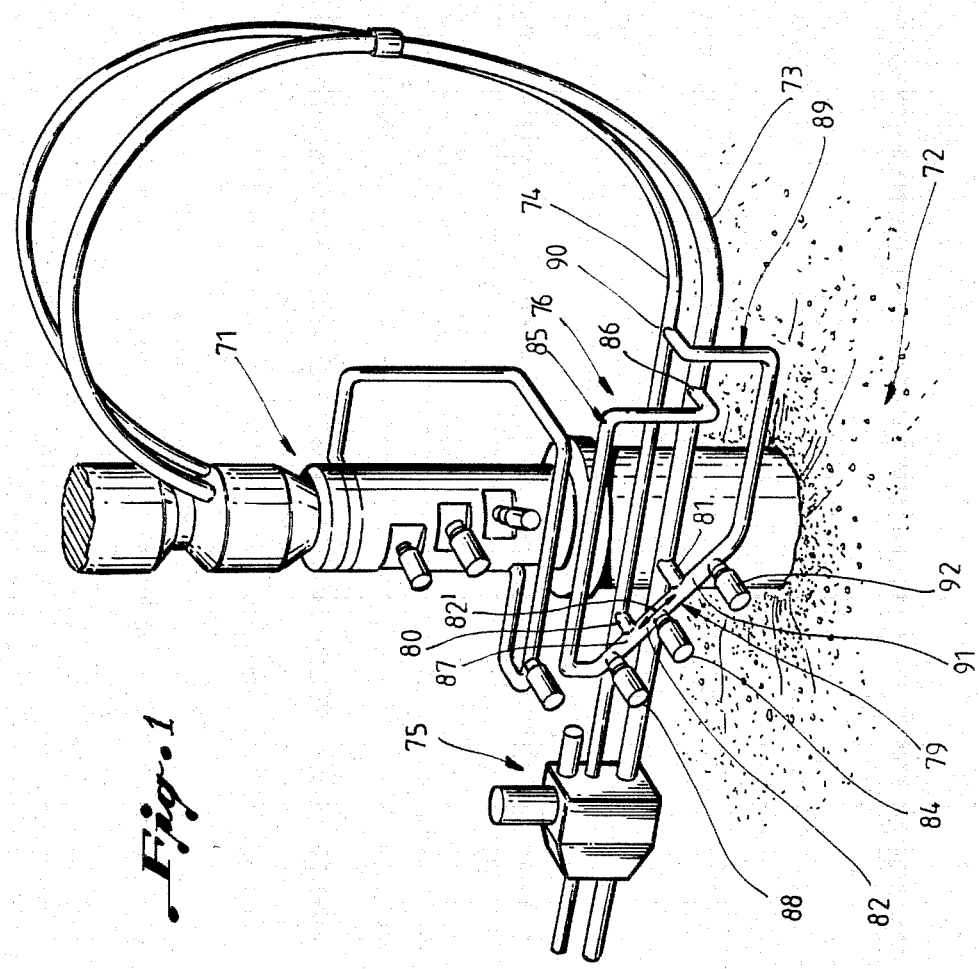

METHOD FOR PIGGING HYDROCARBON PRODUCT FLOWLINES

BACKGROUND OF THE INVENTION

1. Field of the Invention

This invention relates to a method and apparatus for pigging, or cleaning, the interior surfaces of flowlines, and more particularly, to the pigging of dissimilar size dual flowlines associated with subsea wells.

2. Description of the Prior Art

The need exists in the offshore production of oil and gas from a subsea satellite well to provide a method and apparatus to pig, or clean, flowlines which typically pass oil and gas products therethrough. It is common in the hydrocarbon production art to remote such deposits and/or debris from flowlines by pumping a tool, or "pig", through the flowlines. The pig scrapes of dislodges the deposits and/or debris from the flowlines so that the deposits and/or debris are carried out of the lines by the fluids flowing therethrough.

Subsea satellite wells may produce heavy crude oil having a pour point of 30° F. or higher. The crude produced may also contain carbon dioxide, hydrogen sulfide, and water. Because of the high pour point and the corrosive components, the production flowline should be periodically pigged for corrosion control, and to remote paraffin deposits. The presence of the hydrogen sulfide, carbon dioxide, and water in the produced crude oil will form a corrosive condition within the flowlines. Pigging is normally used as part of an overall corrosion control program to remove scale from the flowlines and sweep out water that may collect in low spots in the flowlines. Additionally, for wells producing heavy crude oils with relatively high pour points, heavy oil in the flowlines will become very viscous after a well is shut-in because of the high pour point of the crude and the low sea floor temperature (e.g., 45° F.). Thus, pigging may be required prior to production start-up to remove cold, heavy oil, as well as paraffin deposits or scale.

Subsea satellite wells may utilize dissimilar size flowlines to provide high flow rates through the larger flowline, and still allow dual tubing strings to fit within standard oil well casing sizes. Accordingly, the capability to pig subsea satellite well flowlines of dissimilar sizes is of increasing importance, as more subsea well systems are used in non-ideal operating conditions.

At present, it is not believed that there has been proposed, manufactured, or installed, a dedicated subsea satellite well pigging system for dissimilar size dual flowlines. Further, commonly used pigging procedures for subsea satellite wells with dissimilar size flowlines which utilize either standard pigs, such as foam or spherical pigs, or through-the-flowline (TFL) tools rely on fluid circulation within the flowline to remove debris from the flowline. These procedures do not allow the pig to physically push the debris to the surface facility or production platform.

Accordingly, prior to the development of the present invention, there has been no method or apparatus for pigging dissimilar size dual flowlines for subsea satellite wells which does not solely rely upon fluid circulation to remove debris from the flowlines, and allows the pig to physically push various types of deposits and/or debris from the flowline to the surface facility. Therefore, the art has sought a method and apparatus for pigging dissimilar size dual flowlines utilized for subsea satellite wells, which: approximate full loop pigging; do not solely rely upon fluid circulation to remove debris from the flowlines; and allow the pig to physically push deposits and/or debris from within the flowlines to the surface facility.

SUMMARY OF THE INVENTION

In accordance with the invention, the foregoing advantages have been achieved through the present method and apparatus for cleaning debris from the interior surfaces of a first and second flowline associated with a subsea satellite well. During producing operations, the first and second flowlines are used to pass hydrocarbon products from the subsea well to the surface facility or production platform. During pigging operations, the well is shut-in to isolate the first and second flowlines from the source of hydrocarbon products.

The method of the present invention includes the steps of: providing a crossover flowline in fluid communication with the first and second flowlines; disposing a crossover valve in the crossover flowline; providing a first bypass flowline with a first end in fluid communication with the first flowline and a second end in fluid communication with the crossover flowline; disposing a first bypass valve in the first bypass flowline; providing a second bypass flowline with a first end in fluid communication with the second flowline and a second end in fluid communication with the crossover flowline; disposing a second bypass valve in the second bypass flowline; establishing a fluid flowpath through the crossover flowline and the first bypass flowline; pumping a first pig into the first flowline to push debris into the crossover flowline, first bypass flowline, and the second flowline; stopping the first pig between the crossover flowline and the first end of the first bypass flowline; establishing a fluid flowpath through the crossover flowline and the second bypass flowline; pumping a second pig into the second flowline to push debris into the crossover flowline, second bypass flowline, and the first flowline; stopping the second pig between the crossover flowline and the first end of the second bypass line; pumping the first pig out of the first flowline to push debris out of the first flowline; and pumping the second pig out of the second flowline to push debris out of the second flowline, whereby the two flowlines, crossover flowline, and bypass flowlines are cleaned of debris therein.

Another feature of the method of the present invention is that the method may include the steps of disposing in the first flowline a stop means for stopping the first pig between the crossover flowline and the first end of the first bypass flowline; and disposing in the second flowline a stop means for stopping the second pig between the crossover flowline and the first end of the second bypass flowline.

In accordance with the invention, the foregoing advantages have been achieved through the present apparatus for use with a first and second pig to clean debris from the interior surface of a first and second flowline associated with a subsea satellite well. The apparatus of the present invention may include: a crossover flowline disposed between, and in fluid communication with, the first and second flowline; a crossover valve disposed in the crossover flowline; a first bypass flowline having a first end in fluid communication with the first flowline and a second end in fluid communication with the crossover flowline; a first bypass valve disposed in the first bypass flowline; a second bypass flowline having a first end in fluid communication with the second flowline and a second end in fluid communication with the crossover flowline; and a second bypass valve disposed in the second bypass flowline, whereby upon selective actuation of the crossover and bypass valves, the first pig may be pumped into and out of the first flowline and the second pig may be pumped into and out of the second flowline to clean both flowlines, both bypass flowlines, and the crossover flowline of debris.

Another feature of the apparatus of the present invention is that each of the first and second flowlines may have a stop means for stopping its respective pig therein, the stop means being disposed between the crossover flowline and the first end of each respective bypass flowline. A further feature of the present invention is that the stop means for stopping the first and second pigs may be a locator nipple adapted to cooperate with a locator mandrel disposed on each pig.

The method and apparatus of the present invention for cleaning debris from the interior surface of a first and second flowline, particularly when the flowlines are dissimilar sizes, have a number of advantages over prior art methods and apparatus. The present invention closely approximates full loop pigging. It does not rely solely on fluid circulation to remove debris from the flowlines. Rather, the pigs are allowed to physically push the debris to the surface facility. Further, the present invention does not interfere with or change the production flowpath and does not require extraordinary installation and utilization procedures.

BRIEF DESCRIPTION OF THE DRAWINGS

FIG. 1 is a perspective view of a satellite subsea well which utilizes the method and apparatus of the present invention;

FIG. 2 is a plan view of the apparatus of the present invention; and

Figure 3:
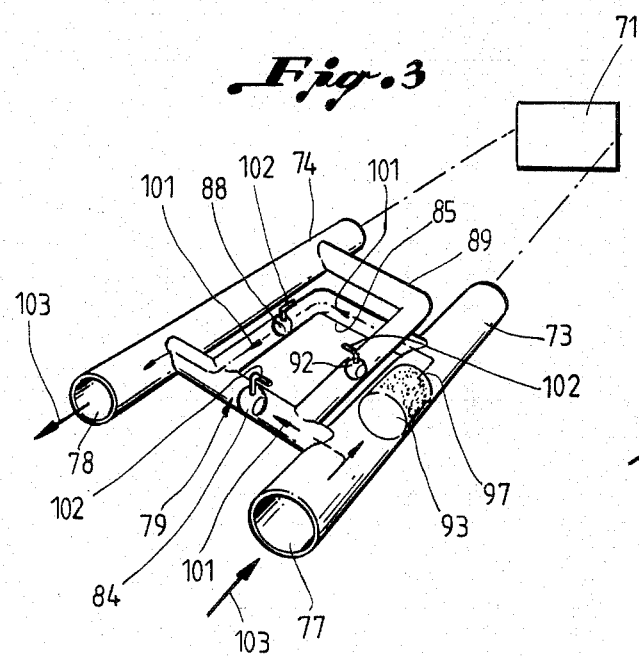
FIGS. 3-6 are sequential, perspective views of an apparatus in accordance with the present invention, illustrating the sequential steps of the method of the present invention.

While the invention will be described in connection with the preferred embodiment, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF THE INVENTION

With reference to FIG. 1, a conventional production tree 71 is shown disposed upon ocean floor 72. Production tree 71 includes a first and second flowline 73, 74 which extend between production tree 71 and a conventional tree flowline connector 75. Typically, oil products pass from production tree 71 through first flowline 73. Second flowline 74 may be utilized as a gas lift or gas injection flowline. As illustrated in FIG. 1 the diameter of first flowline 73 is larger than the diameter of second flowline 74. The pigging apparatus 76 of the present invention, as will be hereinafter described in greater detail, may be disposed between production tree 71 and tree flowline connector 75. As previously described, flowlines 73 and 74 will normally need to be pigged, or cleaned, for corrosion control and/or to remove paraffin deposits prior to production start-up of the well if it has been previously shut-in. Typically, the interior surfaces 77, 78 (FIG. 2) of first and second flowlines 73, 74 will have scale, water, paraffin deposits, and/or other debris therein, as well as cold, heavy oil in the case of a production start-up following shut-in of the well, all of which need to be removed from the interior surfaces 77, 78 of first and second flowlines 73 and 74.

With reference now to FIGS. 1 and 2, the apparatus 76 of the present invention for cleaning such debris from the interior surface 77, 78 of a first and second flowline 73, 74 will be described in greater detail. It should be noted that during producing operations each flowline 73, 74 is in fluid communication with a source of hydrocarbon products, or production tree 71 as illustrated in FIG. 1. Prior to beginning the pigging operation of the present invention, appropriate valves on production tree 71 would be closed to shut-in the well, thereby isolating the flowlines 73, 74 from the source of hydrocarbon products. Following completion of the pigging operation, the valves would be opened to reestablish the production flowpath. It should also be noted that the various components of the pigging apparatus 76 are the same as illustrated in FIG. 1 and FIGS. 2-6; however, FIGS. 2-6 are a more schematic illustration of the present apparatus 76 of the present invention, whereas FIG. 1 illustrates how the pigging apparatus 76 of the present invention might be conveniently installed on a particular production tree 71.

With reference to FIGS. 1 and 2, it is seen that a crossover flowline 79 is disposed between, and in fluid communication with the first and second flowlines 73, 74. In FIG. 1, crossover flowline 79 includes the pipes 80, 81 and that portion of piping 82 which extends between pipes 80 and 81 as indicated by arrow 82'. In FIG. 2, crossover flowline 79 is shown as a straight section of piping 83. A conventional hydraulically actuated crossover valve 84 is disposed in the crossover flowline 79. A first bypass flowline 85 has a first end 86 in fluid communication with the first flowline 73 and a second end 87 in fluid communication with the crossover flowline 79. A hydraulically actuated first bypass valve 88 is disposed in the first bypass flowline 85.

Still with reference to FIGS. 1 and 2, it is seen that a second bypass flowline 89 has a first end 90 in fluid communication with the second flowline 74 and a second end 91 in fluid communication with the crossover flowline 79. A hydraulically actuated second bypass valve 92 is disposed in the second bypass flowline 89. As will be hereinafter described, upon selective actuation of the crossover and bypass valves 84, 88, 92 a first pig 93 (FIG. 3) may be pumped into and out of the first flowline 73 and a second pig 94 (FIG. 4) may be pumped into and out of the second flowline 74 to effectively clean both flowlines 73, 74, both bypass flowlines 85, 89, and the crossover flowline 79 of debris contained therein.

With reference to FIG. 2, it should be noted that the first flowline 73, has a first stop means 95 for stopping a pig therein. The first stop means 95 is disposed between the crossover flowline 79 and the first end 86 of the first bypass flowline 85. Preferably, the first stop means 95 is a locator nipple 96 of conventional construction which is adapted to cooperate with a locator mandrel 97 (FIG. 3) of conventional construction disposed on the first pig 93. Likewise, the second flowline 74 may also be provided with a second stop means 98 for stopping a pig therein, which second stop means 98 is disposed between the crossover flowline 79 and the first end 90 of the second bypass flowline 89. Preferably, second stop means 98 is also a locator nipple 99 of conventional construction adapted to cooperate with a locator mandrel 100 (FIG. 4) of conventional construction disposed on the second pig 94.

With reference now to FIGS. 3–6, the method of the present invention for cleaning debris from the interior surface 77, 78 of a first and second flowline 73, 74 will be described. Throughout FIGS. 3–6 it should be noted, as illustrated in FIG. 3, that during producing operations flowline 73 and 74 communicate with a source of hydrocarbon products, such as for example, production tree 71 (shown in block form). As noted above, prior to beginning the pigging operation, the well is shut-in to isolate the flowlines from the well. A pump (not shown) preferably located at the surface facility is used to pump the pigs 93, 94 between the surface facility and the apparatus 76 of the present invention.

After crossover flowline 79, first bypass flowline 85, and second bypass flowline 89 have been provided to first and second flowlines 73 and 74 as previously described with respect to FIGS. 1 and 2, and after crossover valve 84, first bypass valve 88, and second bypass valve 92 have been disposed as previously described in connection with FIGS. 1 and 2, a fluid flowpath is established through the crossover flowline 79 and the first bypass flowline 85 in the following manner as illustrated in FIG. 3. The fluid flowpath, as illustrated by arrows 101 in FIG. 3, is established by opening crossover valve 84 and first bypass valve 88 and closing second bypass valve 92. It should be noted that throughout FIGS. 3–6, the opening and closing of valves 84, 88, and 92 are schematically illustrated by handles 102, whose longitudinal axis will be parallel with the particular flowline to indicate that the valve is open, and whose longitudinal axis will be perpendicular to a particular flowline to indicate that the valve is closed. In actual practice, each of valves 84, 88, and 92 is preferably a conventional remotely actuated hydraulic valve. After the flowpath, as illustrated by arrows 101, has been established, the first pig 93 is pumped into the first flowline 73, which will in turn push debris (not shown) from first flowline 73 into the crossover flowline 79, first bypass flowline 85, as well as into the second flowline 74. With respect to pig 93, as well as pig 94, such pigs are preferably through-flowline-tool strings; however, other conventional pigs such as spherical or foam pigs may be utilized in the method of the present invention. Still with reference to FIG. 3, it should be noted that after pig 93 has passed crossover flowline 79, pig 93 will be stopped, or landed, by first stop means 95 previously described. Accordingly, fluid, as indicated by arrows 103, which fluid is used to pump 93 into first flowline 73, will bypass behind pig 93, whereby continuing fluid circulation through first flowline 73 will pump out any debris in the first flowline 73, crossover flowline 79, and second flowline 74.

Figure 4:
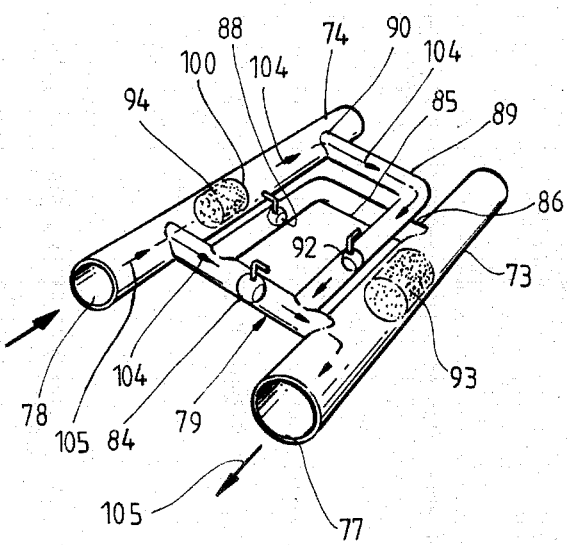

Turning now to FIG. 4, a fluid flowpath is illustrated being established through the crossover flowline 79 and the second bypass flowline 89. This flowpath, as illustrated by arrows 104, is established by closing first bypass valve 88 and opening second bypass valve 92, while keeping the crossover valve 84 in its open position. Upon pumping the second pig 94 into the second flowline 74, debris (not shown) from second flowline 74 will be pushed into the crossover flowline 79, second bypass flowline 89 and then into the first flowline 73.

The second pig 94 may then be stopped between the crossover flowline 79 and the first end 90 of the second bypass flowline 89, as by second stop means 98 previously described. As shown by arrows 105, as pig 94 passes crossover flowline 79, fluid 105 bypasses behind pig 94.

Figure 5:
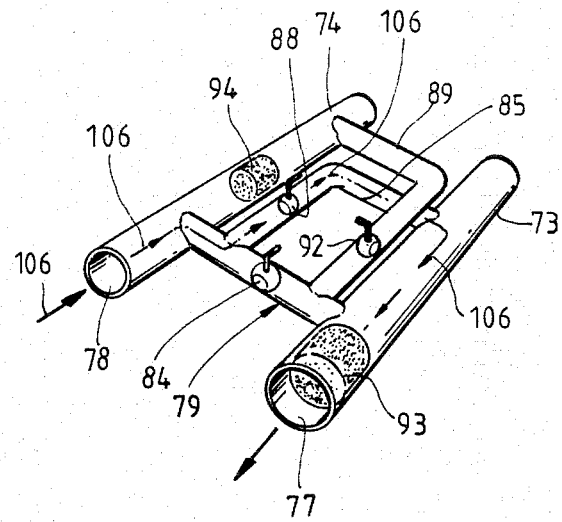

Turning now to FIG. 5, the next step of pumping out the first pig 93 from the first flowline 73 is illustrated. Prior to pumping the first pig 93 out of the first flowline 73, crossover valve 84 and second bypass valve 92 are closed, and first bypass valve 88 is opened. Pig 93 may then be pumped out by pumping fluid, as illustrated by arrows 106, through the second flowline 74, first bypass flowline 85, and into the first flowline 73, whereby debris is pushed out of the first flowline 73 by the first pig 93 as it moves up and out of flowline 73. As seen in FIG. 5, pig 94 remains in the position shown therein due to the closed bypass valve 92 which prevents fluid circulation through second bypass flowline 89. Second stop means 98 prevents pig 94 from moving further into flowline 74.

Figure 6:
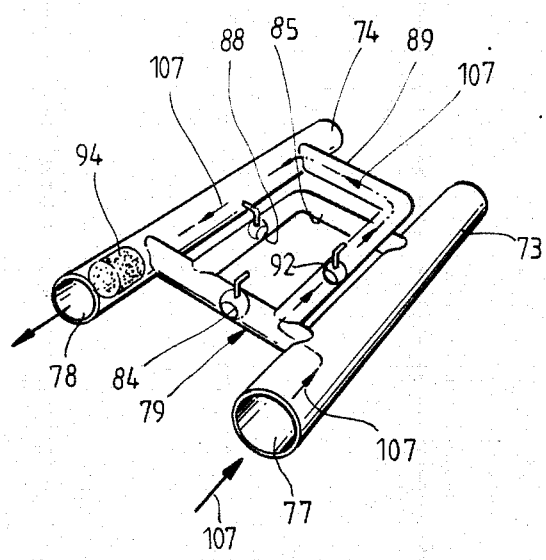

With reference now to FIG. 6, the pumping out of pig 94 from second flowline 74 will be described. Prior to pumping pig 94 out of second flowline 74 to thus push debris out of the second flowline 74, first bypass valve 88 is closed and second bypass valve 92 is opened. Crossover valve 84 remains in its closed position. Fluid, as shown by arrows 107, is then pumped down first flowline 73, through second bypass line 89 and into the second flowline 74, whereby second pig 94 is pushed out of the second flowline 74, thus pushing accumulated debris out of the second flowline 74.

It is to be understood that the invention is not limited to the exact details of construction, operation, materials, or embodiment shown and described, as obvious modifications and equivalents will be apparent to one skilled in the art. For example, the method and apparatus of the present invention could be utilized to also pig two flowlines having the same diameter, as well as dissimilar sized flowlines. Accordingly, the invention is therefore to be limited only by the scope of the appended claims.

What we claim is:

1. A method for cleaning debris from the interior surface of a first and second flowline, said method comprising the steps of:

providing a crossover flowline in fluid communication with the first and second flowlines;

disposing a crossover valve in the crossover flowline;

providing a first bypass flowline with a first end in fluid communication with the first flowline and a second end in fluid communication with the crossover flowline;

disposing a first bypass valve in the first bypass flowline;

providing a second bypass flowline with a first end in fluid communication with the second flowline and a second end in fluid communication with the crossover flowline;

disposing a second bypass valve in the second bypass flowline;

establishing a fluid flowpath through the crossover flowline and the first bypass flowline;

pumping a first pig into the first flowline to push debris into the crossover flowline, first bypass flowline, and the second flowline;

stopping the first pig between the crossover flowline and the first end of the first bypass flowline;

establishing a fluid flowpath through the crossover flowline and the second bypass flowline;

pumping a second pig into the second flowline to push debris into the crossover flowline, second bypass flowline, and the first flowline;

stopping the second pig between the crossover flowline and the first end of the second bypass line;

pumping the first pig out of the first flowline to push debris out of the first flowline; and pumping the second pig out of the second flowline to push debris out of the second flowline, whereby the two flowlines, crossover flowline, and bypass flowlines are cleaned of debris therein.

2. The method for cleaning of claim 1, wherein the fluid flowpath through the crossover flowline and the first bypass flowline is established by opening the crossover and first bypass valves, and closing the second bypass valve.

3. The method of cleaning of claim 1, wherein the fluid flowpath through the crossover flowline and the second bypass flowline is established by opening the crossover valve and second bypass valve, and closing the first bypass valve.

4. The method of cleaning of claim 1, including the steps of closing the crossover and second bypass valves and opening the first bypass valve, prior to pumping the first pig out of the first flowline.

5. The method for cleaning of claim 1, including the steps of opening the second bypass valve and closing the first bypass valve and the crossover valve, prior to pumping the second pig out of the second flowline.

6. The method for cleaning of claim 1, including the steps of pumping fluid through the first flowline, crossover flowline, and the second flowline to pump out any debris in said flowlines, this pumping step being performed after the first pig has been stopped in the first flowline.

7. The method for cleaning of claim 1, including the steps of disposing in the first flowline a first stop means for stopping the first pig between the crossover flowline and the first end of the first bypass flowline; and disposing in the second flowline a second stop means for stopping the second pig between the crossover flowline and the first end of the second bypass flowline.

8. The method for cleaning of claim 1, wherein the first pig is pumped out of the first flowline by pumping fluid through the second flowline and first bypass flowline, and into the first flowline.

9. The method for cleaning of claim 1, wherein the second pig is pumped out of the second flowline by pumping fluid through the first flowline and second bypass flowline, and into the second flowline.

10. The method for cleaning of claim 1, wherein through-the-flowline tool strings with locator mandrels are utilized as the first and second pigs.

11. The method of claim 1 wherein the first flowline has a diameter which is larger than the diameter of the second flowline.

12. The method of claim 1 wherein the diameter of the first flowline is the same as the diameter of the second flowline.

* * * * *